United States Patent [19]

Sasaki et al.

[11] Patent Number: 5,331,750
[45] Date of Patent: Jul. 26, 1994

[54] SHOCK ABSORBING STRUCTURE

[75] Inventors: Teruo Sasaki, Nishinomiya; Masahide Fukuda, Kobe, both of Japan

[73] Assignee: Sumitomo Rubber Industries, Ltd., Hyogo, Japan

[21] Appl. No.: 86,463

[22] Filed: Jul. 6, 1993

Related U.S. Application Data

[63] Continuation of Ser. No. 764,104, Sep. 23, 1991, abandoned, which is a continuation of Ser. No. 613,963, Nov. 15, 1990, abandoned, which is a continuation of Ser. No. 304,847 filed as PCT/JP88/00503, May 25, 1988, abandoned.

[30] Foreign Application Priority Data

May 28, 1987 [JP] Japan .................. 62-133114
Jul. 8, 1987 [JP] Japan .................. 62-104797[U]

[51] Int. Cl.⁵ .............................. A43B 13/18
[52] U.S. Cl. ........................... 36/28; 36/30 R; 267/80
[58] Field of Search .............. 36/28, 29, 30 R, 71, 36/32 R; 267/80, 53, 142, 145, 153, 292; 5/481, 461, 476; 220/4 E

[56] References Cited

U.S. PATENT DOCUMENTS

| | | | |
|---|---|---|---|
| 3,197,357 | 7/1965 | Schulpen | 267/145 |
| 3,242,512 | 3/1966 | Beckman | 267/80 |
| 3,251,076 | 5/1966 | Burke | 267/145 |
| 3,834,046 | 9/1974 | Fowler | 36/28 |
| 4,002,315 | 1/1977 | Van Goubergen | 267/292 |
| 4,222,185 | 9/1980 | Giaccaglia | 36/30 R |
| 4,267,648 | 5/1981 | Weisz | 36/28 |
| 4,268,980 | 5/1981 | Gudas | 36/71 |
| 4,451,994 | 6/1984 | Fowler | 36/28 |
| 4,535,553 | 8/1985 | Derderian et al. | 36/29 |
| 4,616,431 | 10/1986 | Dassler | 36/30 R |
| 4,774,774 | 10/1988 | Allen, Jr. | 36/29 |
| 4,798,009 | 1/1989 | Colonel et al. | 36/28 |
| 4,843,735 | 7/1989 | Nakanishi | 36/28 |

FOREIGN PATENT DOCUMENTS

| | | |
|---|---|---|
| 1176458 | 10/1984 | Canada . |
| 0149910 | 7/1985 | European Pat. Off. . |
| 556254 | 2/1957 | Italy .................. 267/145 |
| 2032761 | 5/1980 | United Kingdom . |
| 8101234 | 5/1981 | United Kingdom . |
| 2087902 | 6/1982 | United Kingdom . |

OTHER PUBLICATIONS

Supplementary European Search Report.

*Primary Examiner*—Steven N. Meyers
*Attorney, Agent, or Firm*—Birch, Stewart, Kolasch & Birch

[57] ABSTRACT

The present invention provides a shock absorbing structure made of a rubber-like elastic material having a hardness in the range of 5 to 60, according to a JIS-A type hardness meter and being composed of a base and a plurality of ridges or projections spaced apart in parallel on said base. The shock absorbing structure according to the present invention is suitable as a shock absorbing material, especially, for shoes.

4 Claims, 14 Drawing Sheets

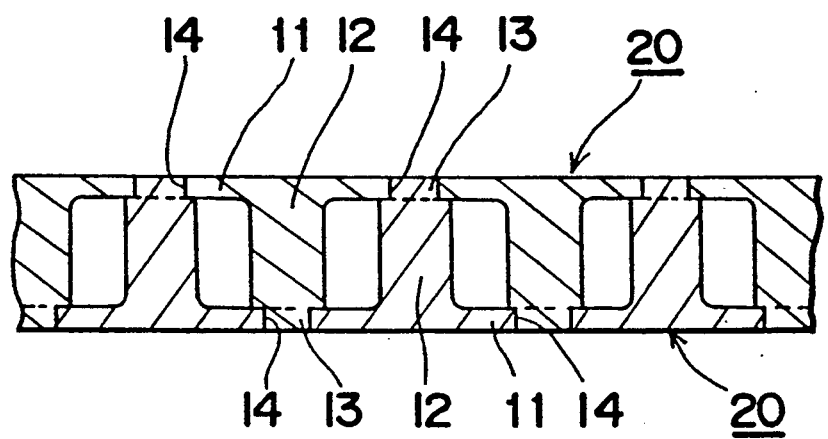
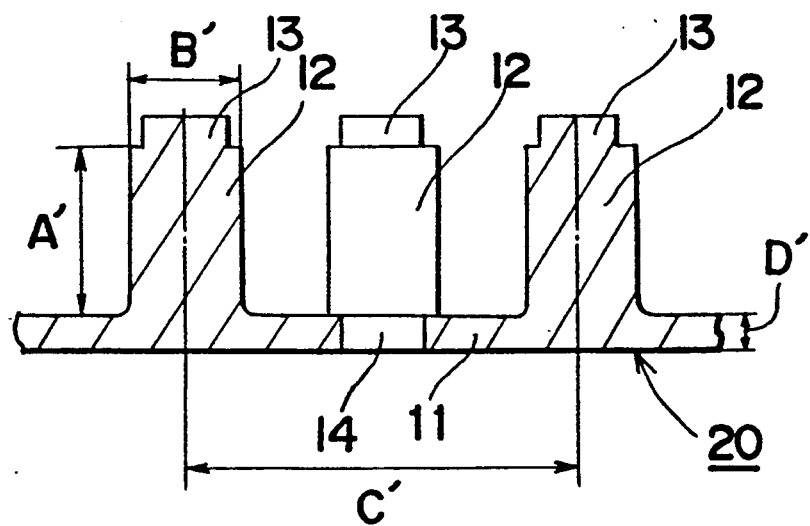

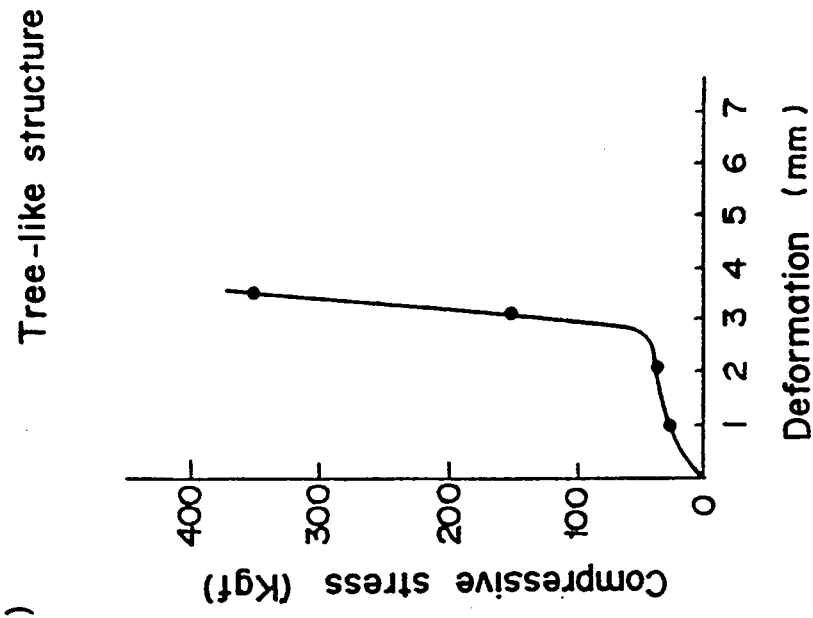
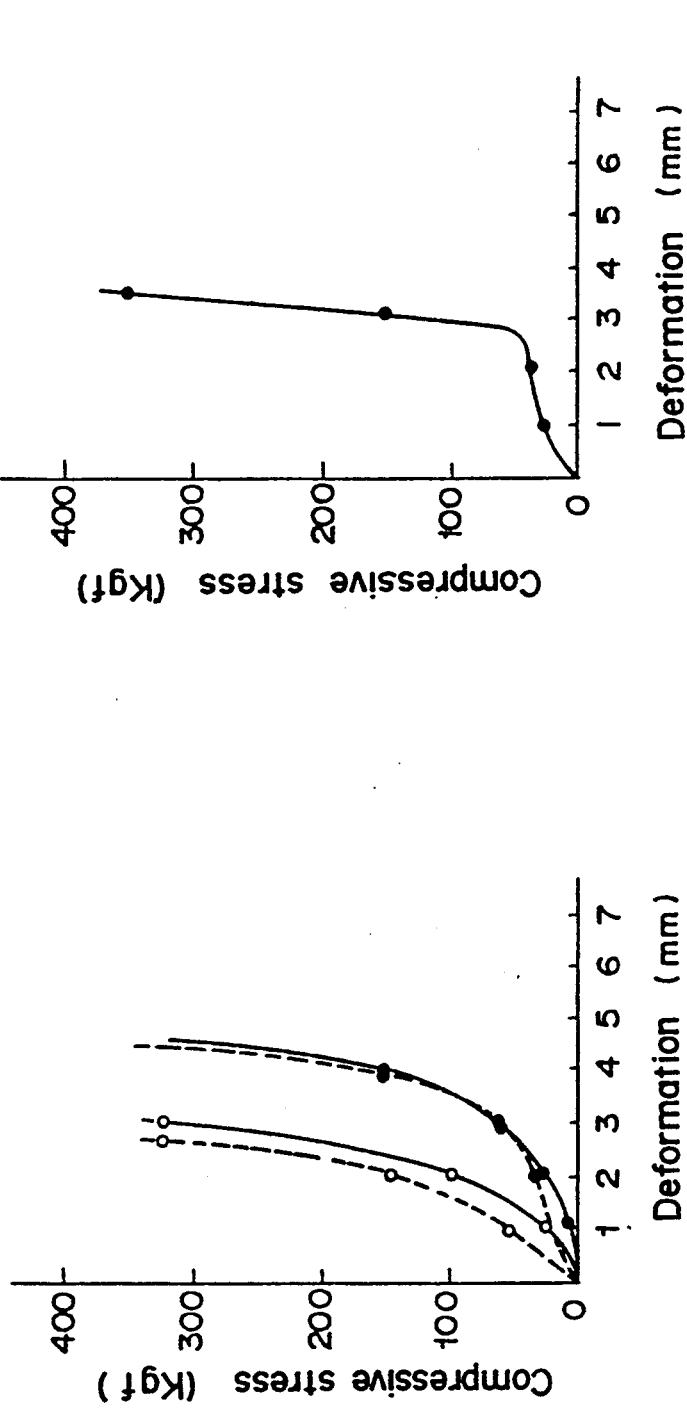

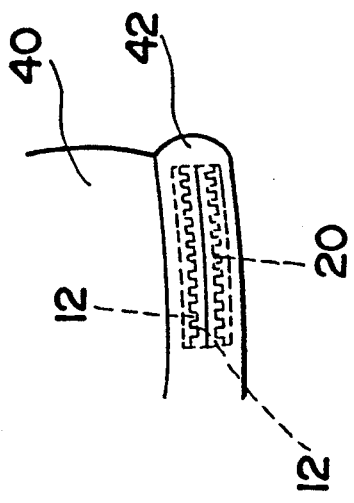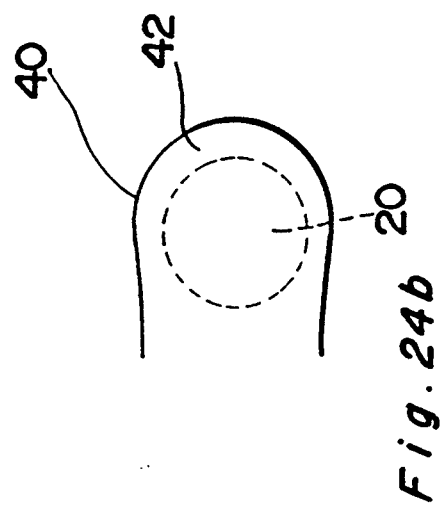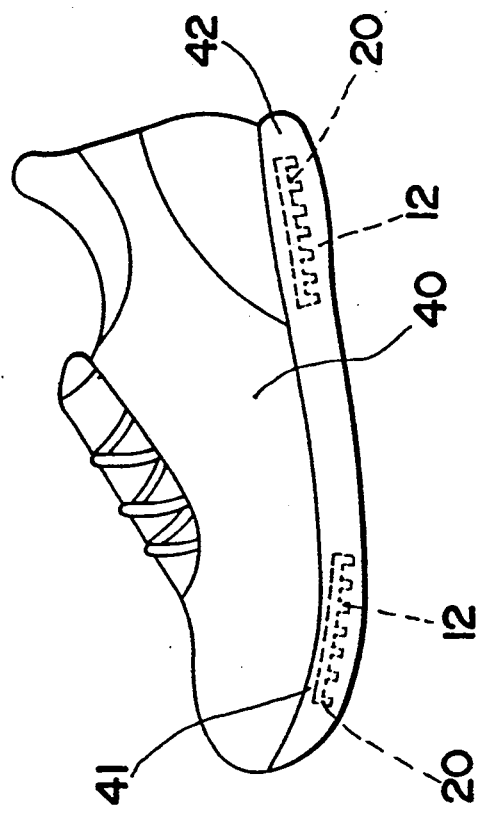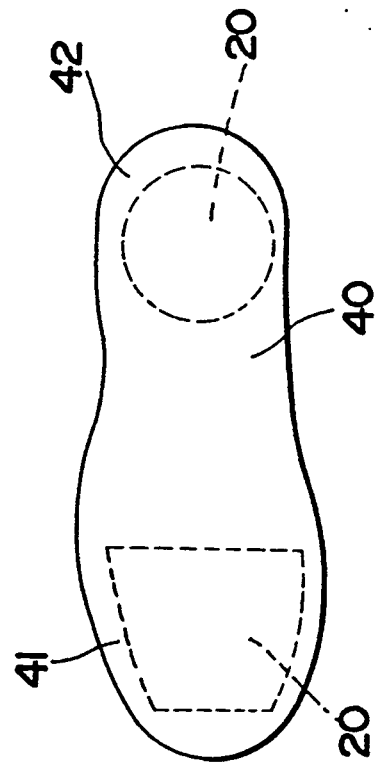

SHOCK ABSORBING STRUCTURE

This application is a continuation of application Ser. No. 07/764,104 filed on Sep. 23, 1991, which was a continuation of Ser. No. 07/613,963, filed Nov. 15, 1990, which was a continuation of Ser. No. 07/304,847, filed Feb. 24, 1989, all now abandoned.

BACKGROUND OF THE INVENTION

1. Field of the Invention

The present invention relates to a shock absorbing structure. More particularly, it relates to a shock absorbing structure suitable for shoes to be used in daily life, sports shoes for jogging, tennis, and golf shoes and the like, shoes for medical usage, mattresses for beds, cushioning sheets for chairs, floor coverings, packing or wrapping materials for protecting products and other shock absorbing materials.

2. Description of the Related Art

Heretofore, there have been used, as shock absorbing materials for shoes, foamed sheets from an ethylene-vinyl acetate copolymer (hereinafter referred to as "EVA"), natural rubber, synthetic rubber, polyurethane and the like, resin structures constructed like a branched tree as disclosed in Japanese Kokohu Publication (examined) 43224/1972, polyurethane solid elastomers having a high shock-damping capacity, bags filled with viscous materials or gas, and the like. These materials, however, have defects in absorbing shock which occurs when the foot contacts the ground, supporting the body or receiving impact force at the time of striking the ground with the foot without restricting motion of the body in walking and exercising.

It is ideally required that the shock absorbing material absorb the impact force which occurs in walking or exercising. It is also required against back and forth motion or right and left motion which occur in exercising, that the material firmly fix the foot on the ground and prevent the right and left motion as far as possible, and that the material simultaneously produce a reacting force for the next motion. It is further required that the shock absorbing material protect the ankle. These requirements are contrary to each other. For example, if a soft material is employed as the shock absorbing material, it often twists the ankle and may often injure it. Accordingly, conventional shock absorbing materials are poor in durability, cushioning characteristics, producibility of reaction force, protection of an ankle and a combination thereof.

For example, in view of durability, the EVA foam and the tree-like resin structure are too high in change rate in comparison with the other materials, such as, synthetic rubber, natural rubber, polyurethane, synthetic rubber foams and the polyurethane rubber foams (See Table 3). They are also poor in appearance after a compression test. These results indicate that the EVA foam and the tree-like resin structure reach a permanent compression set of an early stage and are poor in durability. Thus, they are not suitable in long time usage. The polyurethane foam and the synthetic rubber foam has a small change rate in comparison with the EVA foam and has good durability. They, however, are not good in change rate in comparison with non-foamed materials and are poor in appearance. They, therefore, are not adequate in view of durability.

In view of shock absorbing properties, the EVA foam, as shown in FIG. 10, has a high stiffness at an initial (light) weight load, but has a smaller stiffness at a heavy weight load. Thus, the foam exhibits good shock absorbing properties in heavy load conditions, e.g. in running, but poor in light load conditions, e.g. in walking. The polyurethane and synthetic rubber foams show shock absorbing properties, as shown in FIG. 11. If the foams have a high stiffness, the degree of deformation at an initial (light) weight load is very small to result in low shock absorbing properties when walking. In order to enhance the shock absorbing properties, if the foams having a low stiffness are employed, then their deformation degrees are inherently too large to protect the ankle in running. The tree-like resin structure, as shown in FIG. 12, is low in initial stiffness and high in stiffness at a heavy weight load due to its structure. Thus, this structure is preferred, because the shock absorbing properties are good in walking and the deformation degree is small in a heavy weight load condition, such as in running. This structure, however, has defects in that the foot is not fixed and moves in the shoe in which the foot is put, in such sports as need an accelerated speed, i.e. track events and tennis. It is also necessary that the structure be made from a hard resin, in order to fully enjoy its technical effects. Shoes thus made, however, have a bad feeling when the foot is put in them. When the tree-like structure is incorporated in the shoes, flashes which occur from cut portions have to be removed and the resulting structure also has to be covered with cloth. Accordingly, this structure has some difficulties in producibility.

The polyurethane solid elastomers having a high shock-damping capacity and the bags filled with viscous fluid have excellent shock absorbing properties, but are short of reaction forces necessary for the next motion and insufficient to protect the ankles. The bags filled with gas have a defect that the gas gradually leaks out after a long time.

In order to resolve the above mentioned defects, it is also proposed to combine two or more materials mentioned above. The combination makes a toe and a heel of a shoe thick, which makes it heavy. The process for preparing the shoes is also complicated.

As discussed above, the conventional shock absorbing materials have the following defects: (1) durability is poor, and (2) Each one of the materials does not have fully satisfactory shock absorbing properties. For example, the material has proper shock absorbing ability even in a light weight load in walking but, if in a heavy weight load in running, it has an increased stiffness and a little deformation. Further, reaction forces necessary for the next motions are produced and twist of the ankle does not occur. (3) In the case where two or more of the materials are combined to obtain desirable properties, weight and thickness increases and its production process becomes complicated. It often has a defect in durability.

SUMMARY DISCLOSURE OF THE INVENTION

The present invention provides a shock absorbing structure made of a rubber-like elastic material having a hardness in the range of 5 to 60, according to a JIS-A type hardness meter, and being composed of a base with a plurality of ridges or projections spaced apart in parallel on the base.

The shock absorbing structure of the present invention has excellent durability, since it is made of the rubber-like elastic material having a low hardness of 5 to 60, according to the JIS-A type hardness meter and a low permanent compressive set. The structure is less in permanent set in fatigue than conventional foamed sheets and resin structures and lighter than the solid elastomer and the bags filled with viscous fluid. Since the structure has ridges or projections spaced apart in parallel on the base, which are made of the rubber-like elastic material, the ridges or the projections are bent down by a certain weight load, which exhibits shock absorbing ability. It therefore absorbs a large amount of energy and simultaneously produces reaction forces necessary for the next motion. This structure also prevents twisting of the ankle. Accordingly, at a light weight load, the ridges or projections are bent down and absorb the energy. With a long weight load, they are completely turned down to form a construction as if it were a solid rubber body, which supports the heavy weight load. The bent ridges or projections provide the reaction force necessary for the next motion and fix the ankle to prevent the twisting of the ankle. If two structures are superposed upon each other so as to face their ridges or projections with each structure, the superposed structure can endure against a larger weight load. The structure of the present invention does not have to contend with leaking out of gas which is often seen in the bags filled with gas.

BRIEF EXPLANATION OF THE DRAWINGS

The present invention is illustrated based on the following drawings. It is convenient to separately explain the ridges (first embodiment) and the projections (second embodiment) of the present invention.

FIG. 5 is a partial sectional view which shows two shock absorbing structures of the second embodiment superposed one on the other so that the projections of the one structure face alternately and engage with the other structure's projections.

FIG. 6 is a partial magnified sectional view of the II—II line in FIG. 4.

FIGS. 9 through 15 represent test results relating to Example B.

FIGS. 23a, 23b and 24a, 24b illustrate a further embodiment of the shock absorbing structure of the present invention incorporated into a shoe.

THE FIRST EMBODIMENT

Figure 1:
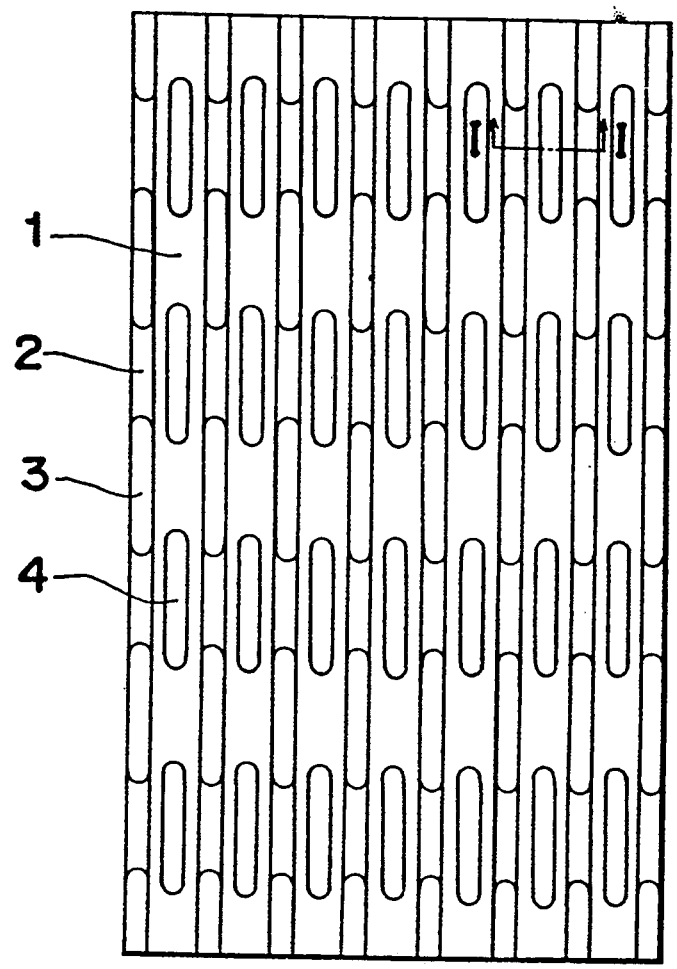
FIG. 1 is a partial plan view which shows the first embodiment of the shock absorbing structure of the present invention.

The first embodiment of the shock absorbing structure of the present invention is composed of a base 1 and a plurality of ridges 2 spaced apart in parallel on the base 1. The structure is formed from a rubber-like elastic material having a hardness of 15 to 50 according to a JIS-A type hardness meter.

The rubber-like elastic material employed in the present invention can be prepared from a rubber composition comprising a rubber component and additives. Typical examples of the rubber components are polyurethane elastomer, polynorbornene, silicone elastomer, isobutylene-isoprene rubber, nitrile-butadiene rubber, styrene-butadiene rubber, natural rubber, a mixture thereof with high-styrene resin, silicone rubber and the like. The material can be used solely or in combination. Most preferred is polynorbornene.

The rubber composition generally contains additives to control hardness. Examples of the additives are reinforcing agents, such as carbon black, white carbon, zinc oxide, calcium carbonate, magnesium carbonate, clay, phenol resins and coumarone indene resins, softening agents, such as higher fatty acid, fatty oil and paraffin oil, plasticizers, such as DOP, DBP, TCP and the like, vulcanizing agents, such as sulfur, inorganic or organic sulfur containing materials, organic peroxides for silicone rubber, peroxides for fluorine rubber, polyamines, isocyanates etc., vulcanization accelerators, such as aldehyde-ammonia compounds, aldehyde-amine compounds, guanidines, thiazoles, thiurams, dithiocarbamates, and the like.

The additives are present in the rubber composition in an amount sufficient to obtain the desired properties of the present invention. The amount can be varied according to the type of the rubber component and the type of the additives.

The elastic material to attain the purpose of the present invention has a hardness of from 5 to 60, preferably from 10 to 50, more preferably 15 to 45, according to the JIS-A type hardness meter. If the hardness is less than 5, stiffness is poor. If the hardness is more than 60, it is too hard to obtain suitable deformation by a weight of the body and therefore is inadequate for the shock absorbing structure.

It is preferred that the elastic material employed in the present invention have a tangent (tan $\delta$) of a phase difference between a displacement and a stress at a frequency of 10 Hz, of at least 0.2 at a temperature of not more than 10° C. and of not more than a half of tan $\delta$ at 10° C., preferably of not more than one third at a temperature of at least 30° C. By the term "tangent (tan $\delta$) of a phase difference between a displacement and a stress at a frequency of 10 Hz" is meant that, when a vibration of 10 Hz is applied to the elastic material, a phase difference, i.e. an angle difference $\delta$ between a sine curve indicating a displacement of the elastic material and a sine curve of a stress against the displacement is expressed by tangent. At a low temperature, the human body is still stiff and poor in shock absorbing ability at the feet and the waist. It, therefore, is desired that the sole of the shoe have high shock absorbing properties at a low temperature, i.e. a large tan $\delta$. The tan $\delta$ is preferably at least 0.2, more preferably from 0.4 to 1.0 at a temperature of 10° C. Values of less than 0.2 reduce the shock absorbing properties to result in a burden on the leg and the waist. If the human body heat rises, the shock absorbing capability of the body is enhanced and the shock absorbing properties of the shoes are not always necessary. It is rather preferred that the kinetic energy of the leg be directly transmitted to the ground without loss of energy. Thus, it is preferred that tan δ of 30° C. is not more than a half of tan δ of 10° C., preferably from ⅓ to ¼ of tan δ of 10° C. Values of more than a half of tan δ of 10° C. do not exhibit the technical effects of the present invention.

The ridges in the structure of the first embodiment of the present invention can be bent down at a certain weight load and absorb shock. The critical weight load at which the ridges are bent down varies depending upon the hardness of the material and the ridge's dimension. Over the critical weight load, the structure functions as if it was solid rubber which supports heavier weight load with little deformation.

Figure 3:
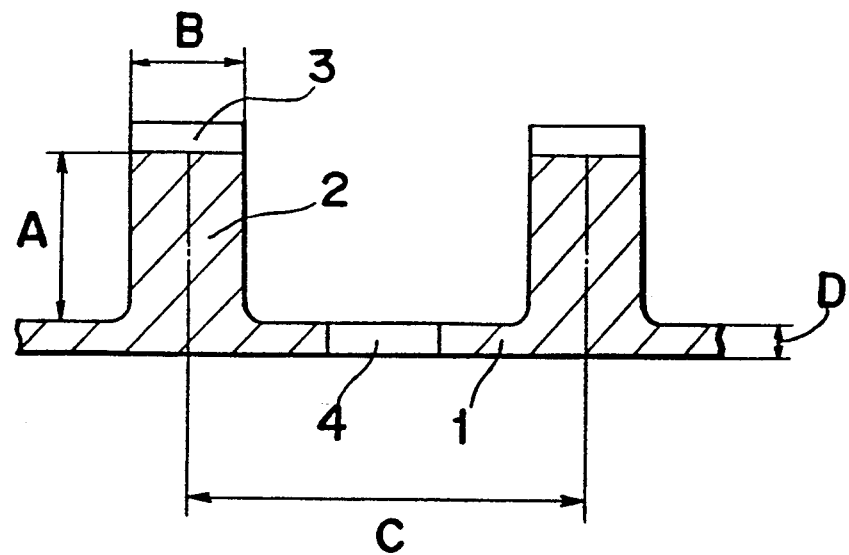
FIG. 3 is a partial magnified sectional view of the I—I line in FIG. 1.

Assuming that, as shown in FIG. 3, the ridges 2 have a height A, a width B, a distance C between centers of two adjacent ridges and a thickness D of the base sheet, it is preferred that the height A is greater than the width B and the distance C is more than twice as large as the width B. When the height A is larger or greater than the width B, the ridges 2 bend with ease. When the distance C is more than twice as large as the thickness B, two sheets having the ridges can be easily superposed.

Figure 2:
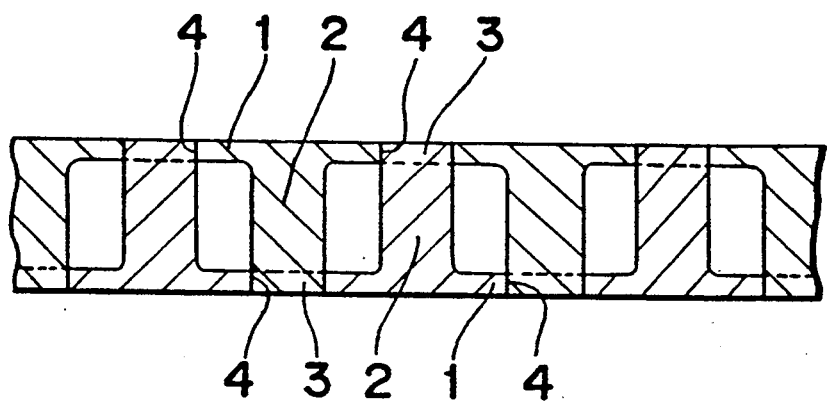
FIG. 2 is a partial sectional view which shows two shock absorbing structures of the first embodiment superposed on each other so that the ridges of one structure are faced with those of another structure, and alternately engaged with the ridges of the other structure.

As is shown in FIG. 2, the two structures are superposed on each other so that the ridges of the one structure face the ridges of the other structure. For this superposed structure, it is preferred that there are protrusions 3 spaced apart at constant intervals on the top of the ridges 2. It is also preferred that the base 1 has hollows 4 to be joined with the protrusions 3. The hollows are spaced apart at the same intervals as the protrusions. It is also preferred that the height of the protrusions substantially equal to the base thickness D. When they are superposed, two structures face each other and combine so that the protrusions 3 of the one structure fit into and join with the hollows 4 of the other structure. The superposed structure forms smooth surfaces on the up (top) and down (bottom) sides. When the structures are incorporated as the inner sole into shoes, the smooth surfaces make the adhession between the inner sole and the other elements placed thereon more secure, so that shock absorbing properties are enhanced.

The superposed structure as shown in FIG. 2 may be further superposed on another superposed structure to form a multilayer structure. In the multilayer structure, the direction of the ridges of each layer may be either in one direction or alternately crossed. Both structures are different in physical properties as demonstrated in the Examples.

THE SECOND EMBODIMENT

The second embodiment of the present invention is a structure composed of a base 11 and a plurality of projections 12 spaced apart in parallel on the base 11. The structure is made from a same rubber-like elastic material as the first embodiment.

Figure 4:
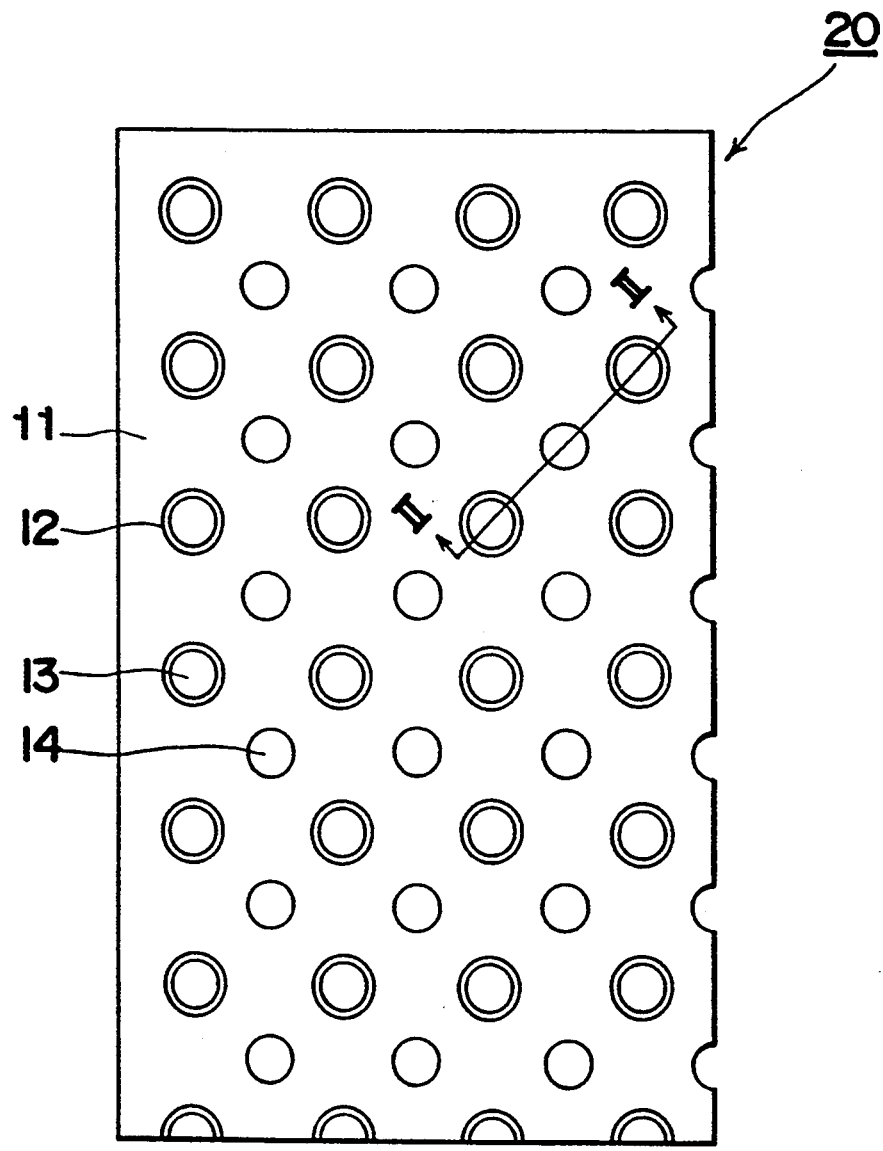
FIG. 4 is a partial plan view which shows the second embodiment of the shock absorbing structure of the present invention.

In FIG. 4, the projections have a column shape, but other shapes, such as prismatic, ellipsoid, conic, pyramidal truncated cone, truncated pyramidal, etc. can be employed. The projections 12 are bent down at a light weight load to absorb shock. A critical weight load at which the projections 12 are bent down is defined and varied by the dimension of the projections and the hardness of the elastic material. Over the critical weight load, the structure functions as if it was solid rubber which supports heavier weight loads by a small dimensional deformation. The structure also produces force necessary for the next motion and fixes the ankle to prevent it from twisting.

In order to exhibit the shock absorbing properties, where the projections 12 are columns, it is preferred that the height of the projections 12 be at least 1.5 times larger than their diameter. In case where the projections 12 are prismatic, it is preferred that the height be at least 1.5 times larger than the shorter side of the base face. If the height of the projections 12 is less than the above value, the projections 12 are so difficult to bend that shock absorbing properties are deteriorated at a low load. Although the diameter of the projections 12 are varied by the hardness of the elastic material, their dimensions and distance between two projections, it is generally 1 to 20 mm and selected in view of desired shock absorbing properties.

The distance between two projections is also varied depending upon the hardness of the elastic material, and the shape and dimension of the projections, but preferably the distance between centers of two adjacent projections is 1.5 to 4 times, more preferably 2 to 3 times larger than the diameter of the projections 12.

As is shown in FIG. 5, the two structures are superposed on each other so that the projections are facing each other. For this superposed structure, it is preferred that there are protrusions 13 on the top of the projections 12 and the base 1 has hollows 14 to be joined with the protrusions 13. The hollows 14 are spaced apart in the same intervals as the protrusions. It is also preferred that the height of the protrusions substantially equal to the thickness and a plane sectional area of the hollows 14 is a little less than the surface area of the protrusion 13. When they are superposed, the two structures face each other and combine so that the protrusions 13 of the one structure are joined with the hollows 14 of the other structure. The superposed structure forms smooth surfaces on the up (top) and down (bottom) sides. When the structure is incorporated as an inner sole into shoes, the smooth surfaces make the adhesion between the inner sole and the other elements placed thereon is more secure, so that the shock absorbing properties are enhanced. The dimensions of the protrusions 13 and the hollows 14 are not specifically limited. Also, it is not necessary that all projections 12 have such protrusions 13. In other words the protrusions 13 can be formed on just some of the projections 12. In this case, the hollows 14 can also be formed in sufficient number to be joined with the protrusions 13. The distance between the projections may be approximately the same and the distance between the protrusions 13 and the hollows 14 may also be approximately the same. The shapes and dimensions of the projections, protrusions and hollows can also be approximately the same.

The superposed structure as shown in FIG. 5 may be further superposed on another superposed structure to form a multilayer structure.

PREFERRED EMBODIMENTS

The present invention is illustrated by the following Examples which are not to be construed as limiting the present invention to their details.

EXAMPLE A

Rubber compositions were prepared from ingredients shown in Table 1 in which all numbers except hardness are in parts by weight.

TABLE 1

| Ingredients | Example | Comparative Example |
| --- | --- | --- |
| Norsolex[1] | 100 | 100 |
| Highsole[2] | 150 | 130 |
| DOP (plasticizer) | 30 | 50 |
| Nippol 2007J[3] | — | 20 |
| Zinc oxide | 5 | 5 |
| Stearic acid | 1 | 1 |
| Asahi Thermal[4] | 15 | 15 |
| Sulfur | 1.5 | 1.5 |
| Noriseler TT[5] | 1 | 1 |
| Noriseler TBT-N[6] | 1.5 | 1.5 |
| Noriseler TTT-E[7] | 0.5 | 0.5 |
| Noriseler M[8] | 1 | 1 |
| Hardness | 30 | 40 |

[1] Polynorbornene available from Nippon Zeon Co., Ltd.
[2] Aromatic softener available from Nippon Petrochemicals Co. Ltd.
[3] High styrene resin available from Nippon Zeon Co. Ltd.
[4] FT carbon available from Asahi Carbon Company.
[5, 6, 7] and [8] Vulcanization accelerator available from Ouchi Shinko Chemical Industries Company.

Figure 7:
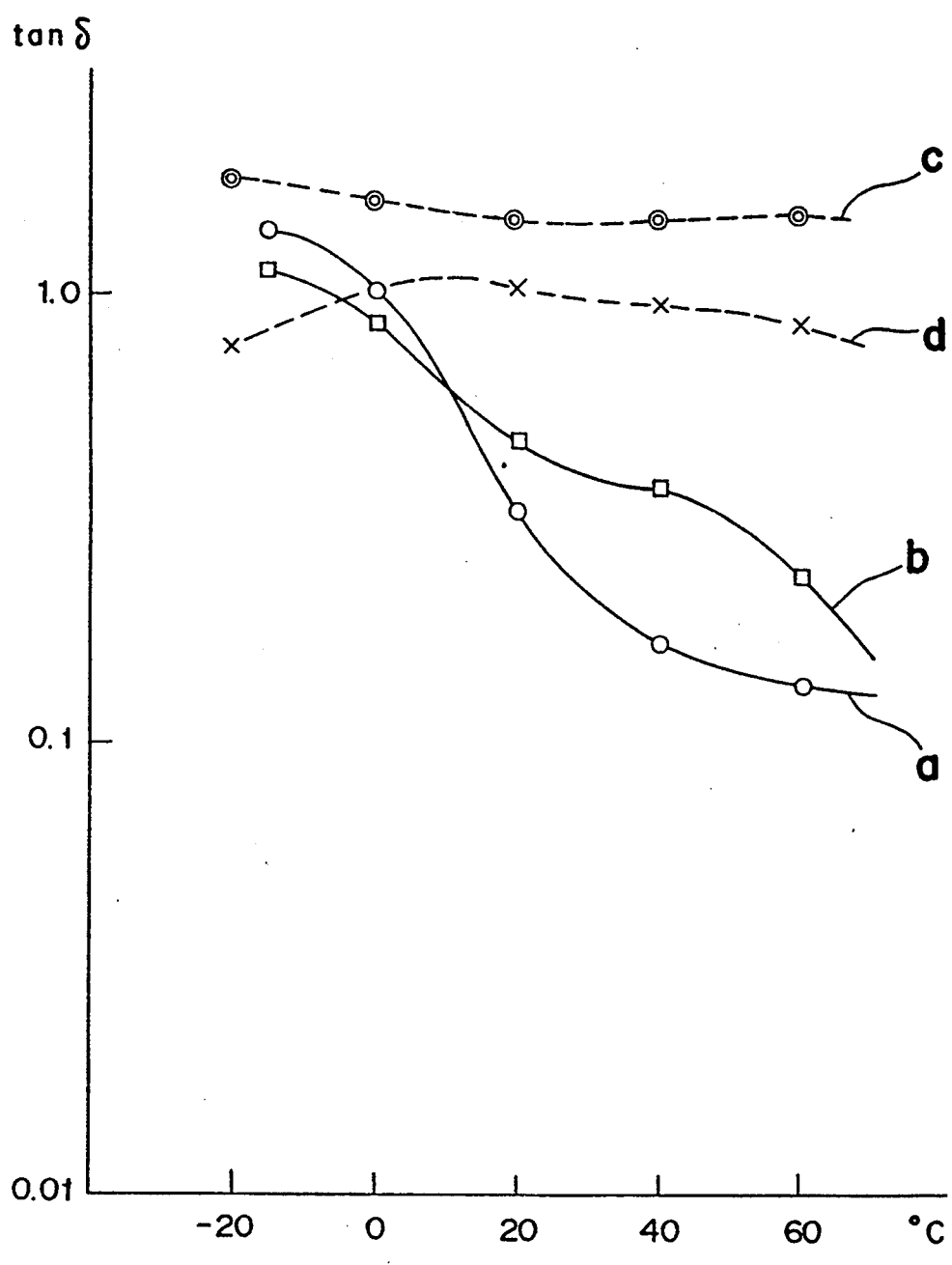
FIGS. 7 and 8 represent the results of Example A.

The rubber composition of the Examples of Table 1 were formed into 1.2×4.0×45 mm and vulcanized at 165° C. for 5 hours to obtain a test piece. The piece was subjected to a measurement of tan δ at length 30 mm, amplitude 0.5%, initial deformation 3 mm, heating rate 1° C./min and frequency 10 Hz by using VISCOELASTIC SPECTROMETER TYPE VES-F3 available from Iwamoto Manufacturing Company. The same test was conducted on test pieces prepared from the rubber composition of the Comparative Example, Silicongen and Sorbosein which are known as a shock absorbing material of sports shoes and available from Sanshin Kosan Company. The obtained results are shown in FIG. 7. FIG. 7 uses logarithm scale in which (a) shows Example of the present invention, (b) shows Comparative Example, (c) shows Silicongel and (d) is Sorbosein.

The rubbers of the Example, Comparative Example and Sorbosein were used in 5 mm thickness as inner sole of sports shoes to produce sports shoes. Ten persons wore the sports shows and jogged for one hour at 10° C. They evaluate the feeling the shoes and the result is shown in Table 2.

TABLE 2

|  | At wearing | 20–30 min | 60 min |
| --- | --- | --- | --- |
| Example | Comfortable | Comfortable | Few tired |
| Comparative Example | Comfortable | Slightly hard | Slightly tired |
| Sorboseinve Example | Comfortable | Soft, but slightly tired | Tired on the ankel |

Figure 8:
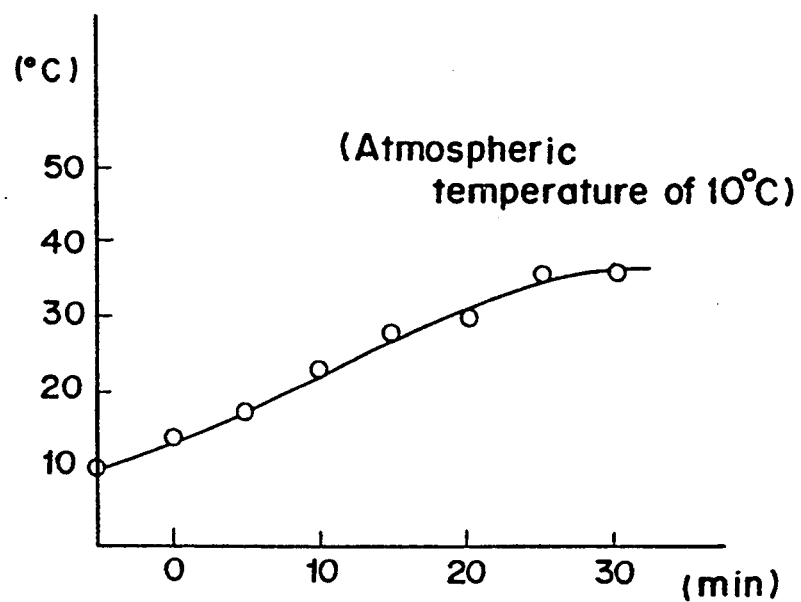

Temperatures inside the shoes which the ten persons wore were measured at an interval of 5 minutes. The result is shown in FIG. 8.

EXAMPLE B

This example explains the first embodiment of the present invention.

The structure of the first embodiment had the following characteristics: hardness 35 (JIS-A type hardness meter), height of A 3.5 mm, width of B 2.5 mm, distance C 8.0 mm, and thickness D 0.5 mm.

Figure 9:
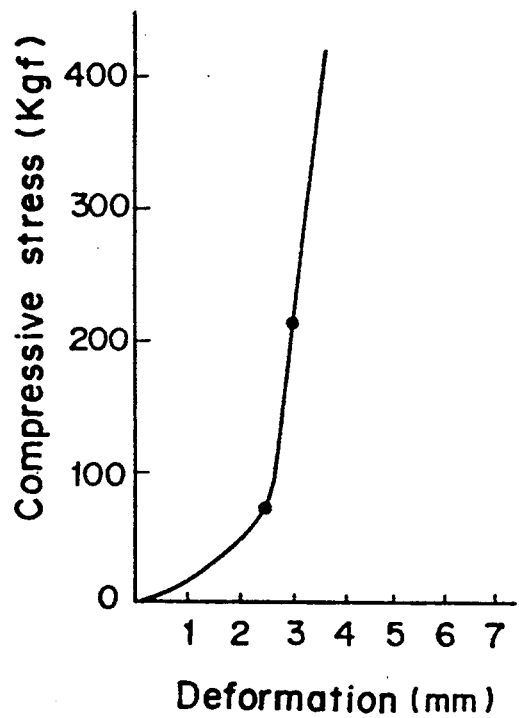

FIG. 9 shows a relation of compression stress with deformation (distortion) when a weight load is applied to one structure. When the weight load is light, the structure is low in stiffness because of the low hardness of the elastic material and the existence of the ridges 2, so as to deform an adequate amount. When the weight load is heavy, the ridges 2 are bent down to show a high stiffness and the structure deforms slightly to support the heavy weight load. Accordingly, when the structure is employed as an inner sole of sports shoes, it absorbs impact force to the ground, and the heavy weight load, such as the body weight and the impact force at the time of striking the ground is supported by a small deformation to tightly fix the ankle. The structure therefore functions as a good shock absorbing structure which does not inhibit exercising motions.

Figure 10:
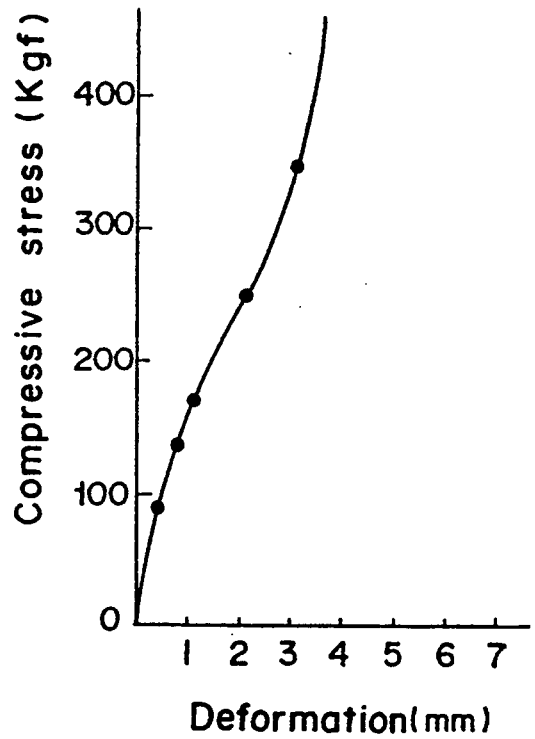

The test of FIG. 9 is conducted on a rubber disk having a diameter of 50 mm, i.e. an area of 19.63 cm$^2$, which nearly equals to an area contacting the ground of the tip of the toe and the heel. This condition is the same in the tests conducted for FIG. 10 concerning with respect to EVA foam, FIG. 11 to polyurethane and synthetic rubber foam, FIG. 12 to a tree like structure, and FIGS. 13, 14 and 15 discussed below, provided that FIGS. 10, 11 and 12 and conducted on a disk having a thickness of 5.5 mm.

Figure 13:
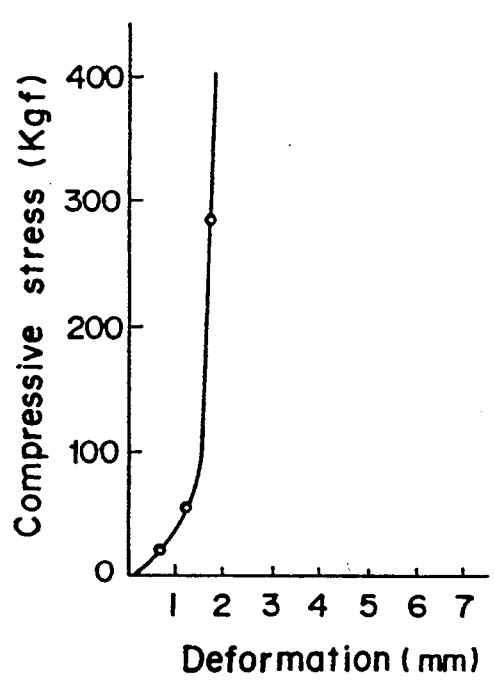

Two sheets of the structure were superposed on each other so that the ridges on one structure face in parallel with the other structure's ridges and subjected to a test for a relation of compression stress and deformation. The result is shown in FIG. 13. As is similar to FIG. 9, the deformation is large in light weight load and small is heavy weight load. The structure of FIG. 13 has a hardness of 25 (JIS-A type hardness meter), a height A of 2.5 mm, a width B of 2.0, a distance C of 7.0 and thickness D of 0.5 mm.

Figure 14:
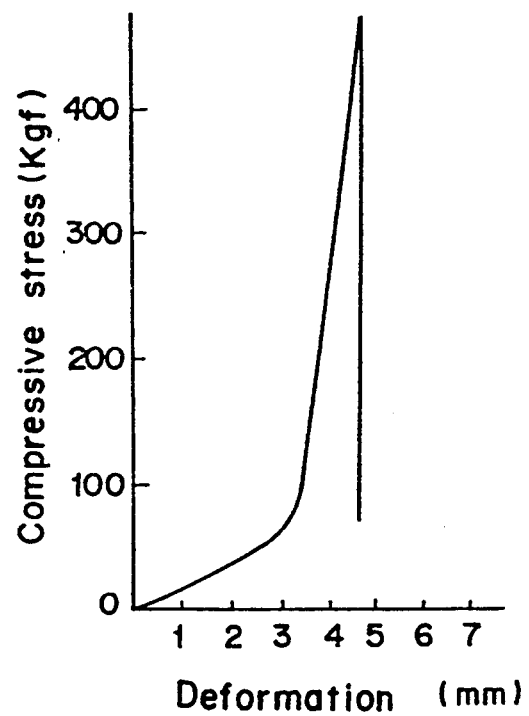

FIG. 14 shows that the same test conducted on the superposed structure for FIG. 13 further superposed with another superposed structure so that the direction of the ridges of the first layer is crossed with that of the second layer. The deformation of this multilayer structure at a light weight load is slightly smaller than that of the structure of FIG. 13, but shows almost similar characteristics.

Figure 15:
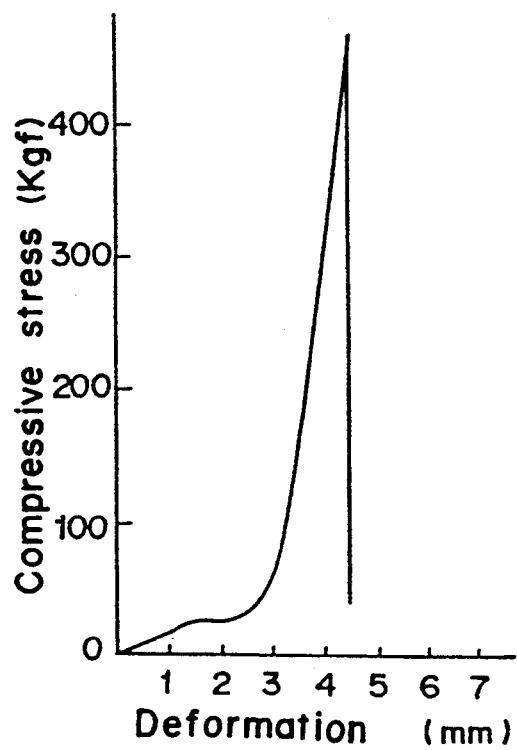

Such a multilayer structure as shown in FIG. 14 can give different properties. For example, if the superposed structure of FIG. 13 is further superposed with another superposed structure so that the direction of the ridges of the first layer is parallel to that of the second layer, it takes a slightly longer time until all the ridges are bent down and the deformation is elevated at a constant compression stress, as shown in FIG. 15.

The following Table 3 shows a comparison of durability between the structure of the present invention and a conventional shock absorbing structure. The structure used in this test was the same as that of FIG. 13. In Table 3, the reason why the hardness of the structure of the present invention is not mentioned is that it is difficult to determine an accurate hardness.

TABLE 3

| No. | Test piece | Hardness (JIS-A) | Change in thickness (mm) Before | After | Chage rate (%) | Appearance after test |
| --- | --- | --- | --- | --- | --- | --- |
| 1 | The structure of | — | 3.02 | 3.02 | 0.0 | Good |

TABLE 3-continued

| No. | Test piece | Hardness (JIS-A) | Change in thickness (mm) Before | After | Chage rate (%) | Appearance after test |
| --- | --- | --- | --- | --- | --- | --- |
|  | the invention |  |  |  |  |  |
| 2 | Synthetic rubber foam | 35 | 2.79 | 2.74 | 1.8 | bad |
| 3 | EVA foam | 55 | 2.78 | 2.67 | 3.9 | Very bad |
| 4 | Polyurethane Foam | 40 | 2.82 | 2.76 | 2.1 | Bad |
| 5 | Non-foamed synthetic rubber | 30 | 2.80 | 2.80 | 0.0 | Good |
| 6 | Non-foamed natural rubber | 45 | 2.79 | 2.78 | 0.4 | Good |
| 7 | Non-foamed polyurethane | 50 | 2.80 | 2.80 | 0.0 | Good |
| 8 | Tree-like resin structure | — | 5.51 | 5.09 | 7.6 | Bad |

The test method: A steel ball of 174 g was dropped 5 times on a test piece from 37 cm height, and change in thickness and appearance after test were evaluated.
Appearance Evaluation was made based on the following standard:
Good: no change in appearance
Bad: slightly poor in appearance
Very bad: very poor in appearance As shown in Table 3, the structure of the first embodiment of the present invention has no change in thickness and in appearance. It shows good durability against repeated compressions.

Table 4 shows the anisotropy of elastic shear properties of the shock absorbing structure of the present invention.

This test was conducted as follow: The superposed structures of the first embodiment as shown in FIG. 2 were placed on the up side and down side of a disk having a diameter of 50 mm, which was incorporated into a compression tester equipped with a circular pressing plate having a diameter of 50 mm. The structure was pulled out sideways at each load of 5 kg f, 10 kg f and 20 kg f, for which a shear force was determined to show in Table 4.

TABLE 4

| No. | Hardness[1] and dimention | Direction[2] (Upper/lower) | Thickness (mm) (Upper/lower) | Shear force (kgf/mm) | | |
| --- | --- | --- | --- | --- | --- | --- |
|  |  |  |  | 5 kgf load | 10 kgf load | 20 kgf load |
| 1 | Hardness 25 | Cross/Cross | 3.9/3.9 | 4.0 | 4.5 | 6.8 |
|  | A = 2.5 mm, B = 2.0 mm | Parallel/Cross | 3.9/3.9 | 4.8 | 6.0 | 8.0 |
|  | C = 7.0 mm, D = 0.5 mm | Parallel/Parallel | 3.9/3.9 | 8.0 | 9.5 | 12.0 |
| 1 | Hardness 35 | Cross/Cross | 3.9/3.9 | 5.2 | 6.0 | 7.3 |
|  | A = 2.5 mm, B = 2.0 mm | Parallel/Cross | 3.9/3.9 | 6.5 | 9.0 | 12.0 |
|  | C = 7.0 mm, D = 0.5 mm | Parallel/Parallel | 3.9/3.9 | 11.0 | 13.0 | 15.0 |

[1]JIS-A type hardness meter.
[2]This direction shows the direction of the ridges in the structure and the direction pulling out the disk. Cross shows that the direction of the ridges is crossed to the direction of pulling out. Parallel shows that the direction of the ridges is paralleled to the direction of pulling out.

As is apparent from Table 4, shear forces can be varied by the hardness of the elastic material, and by the direction of the ridges of the structure. The shear forces can also be varied by the height A, width B, distance C and base thickness D, although this is not shown in Table 3.

Figure 16:
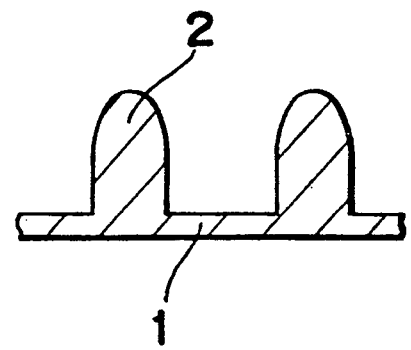
FIGS. 16 and 17 are partial sectional views representing alternate shapes of the ridges of the present invention.
Figure 17:
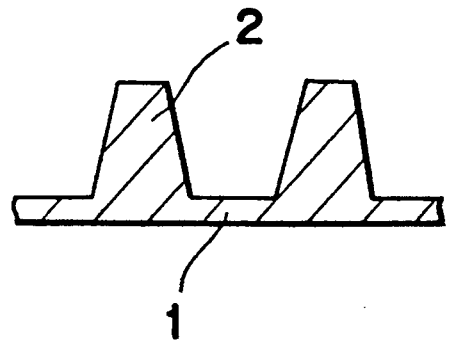

In the present invention, the ridges 2 are not always formed continuously to the same direction, so it may be formed intermittently. Also, the ridges 2 may have a round top as shown in FIG. 16 and may taper off to the top as shown in FIG. 17. Adversely, they can be larger in width as approaching toward the top.

The shock absorbing structure of the present invention can be typically employed as inner sole of shoes. The term the "inner sole" includes both that it is incorporated into the inside of a sole and that it is placed on a sole. The former is commonly done. The structure of the present invention can be used in various forms to exhibit various properties, whereby it is applicable as an inner sole to many applications, such as shoes in daily life, sports shoes for jogging, tennis, golf and shoes for medical usage.

Figure 18A:
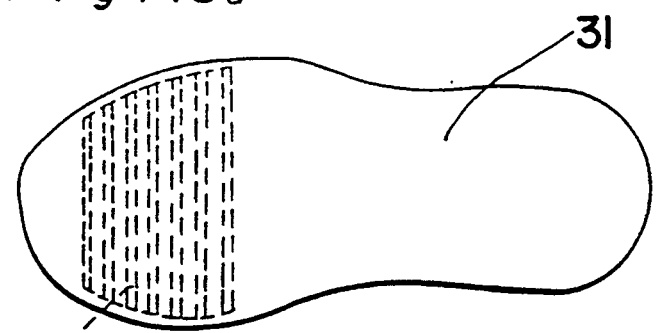
FIGS. 18 and 19 illustrate the incorporation of the shock absorbing structure of the present invention into a shoe.
Figure 18B:
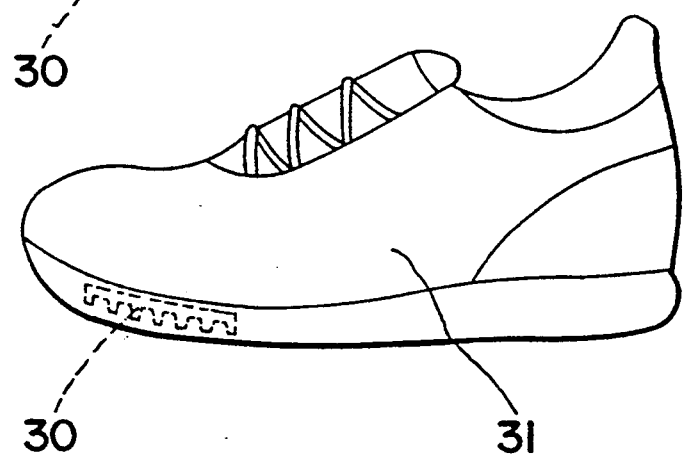
Figure 19A:
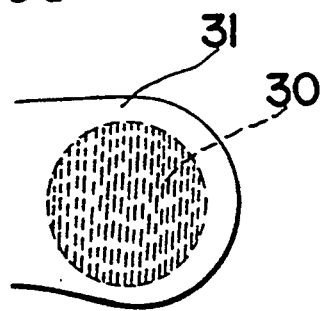
Figure 19B:
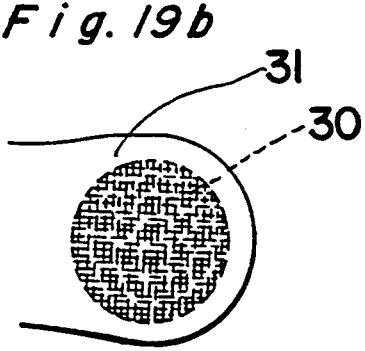
Figure 19C:
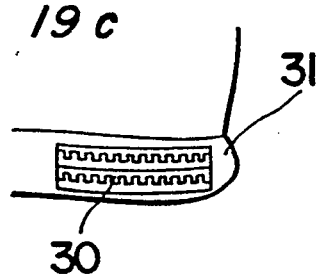
Figure 19D:
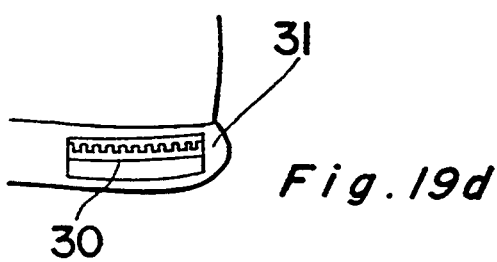

FIG. 18 shows that one shock absorbing structure 30 of the present invention is incorporated as inner sole into the tip toe of a shoe 31 in which the direction of the ridges 2 is a right and left direction of the body. The shoes can firmly fix the ankle in the right to left direction and have excellent shock absorbing properties against back and forth direction force which usually occurs in walking or exercising. In order to fit specific sports, the direction of the ridges can be varied.

In FIG. 19, two sheets of the superposed structures 30 of the present invention are further superposed with each other as facing the ridges to form one layer and two such layers are incorporated as an innersole into a heel portion. In FIG. 19(a), all the ridges are arranged in the right and left direction of the body to firmly fix the ankle and to support a larger impact force because it takes longer times for the ridges to bend over. In FIG. 19(b), the ridges of one layer are arranged in the right and left direction and the other ridges are arranged in the back and forth direction. This is possible to fix the ankle and absorb impact force both in the right and left direction and in the back and forth direction.

As a typical example, a two such layer structure is employed for golf shoes for a middle age male golfer having a weight of 65 kg. In one layer, two sheets of the structures having a hardness of 30 (JIS-A), a height A of 2.5 mm, a width B of 2.0 mm, a distance C of 7.0 mm and a base thickness D of 0.5 mm are superposed with each other as the ridges face each other and the ridges are arranged in the right and left direction of the body. In the other layer, two sheet of the structures having a hardness of 25 (JIS-A), a height A of 3.5 mm, a thickness B of 2.0 mm, a distance C of 7.0 mm and a base thickness D of 0.5 mm are superposed as mentioned above and the ridges are arranged in the back and forth direction of the body. The shoes effectively prevent the shift of the legs against impact force onto both legs when hitting a golf ball and also absorbs shock upon reaching the ground and at striking the ground in walking.

If such multilayer structure is applied to shoes for medical usage, such as for rehabilitation, it makes possible rehabilitation without excess weight load on the legs because of scattering such load on the legs and of effectively reducing impact force in walking.

Figure 20:
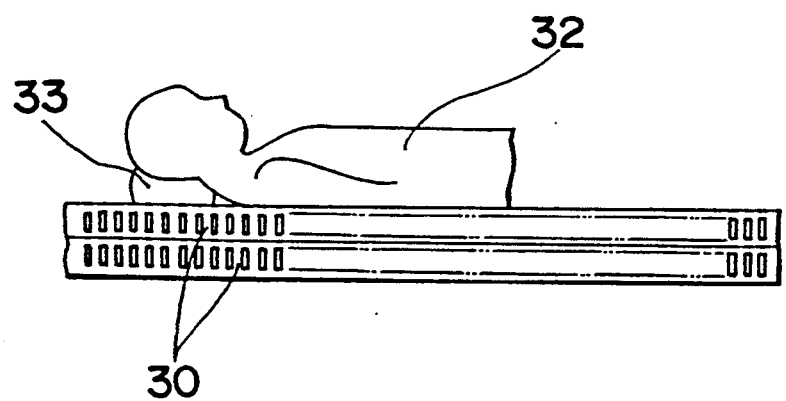
FIG. 20 illustrates the incorporation of the shock absorbing structure of the present invention into a mattress.
Figure 21:
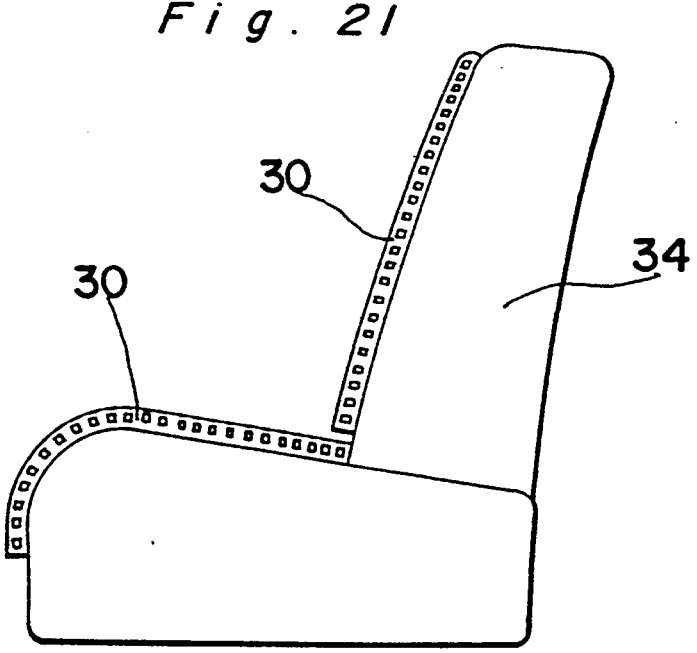
FIG. 21 illustrates the incorporation of the shock absorbing structure of the present invention into a chair.

The structure of the present invention may also be suitable for mattresses for beds, as shown in FIG. 20. In this case, the multilayer structure mentioned above is preferred, in which the ridges are arranged in a right and left direction of the body. This construction effectively prevents bedsores. In FIG. 20, 32 shows the human body and 33 shows a pillow.

The structure of the present invention can be used for a cushioning sheet of a chair 34, as shown in 21. In this case, the structure can be the superposed one or the non-superposed one.

EXAMPLE C

This example illustrates the second embodiment of the present invention.

Figure 22:
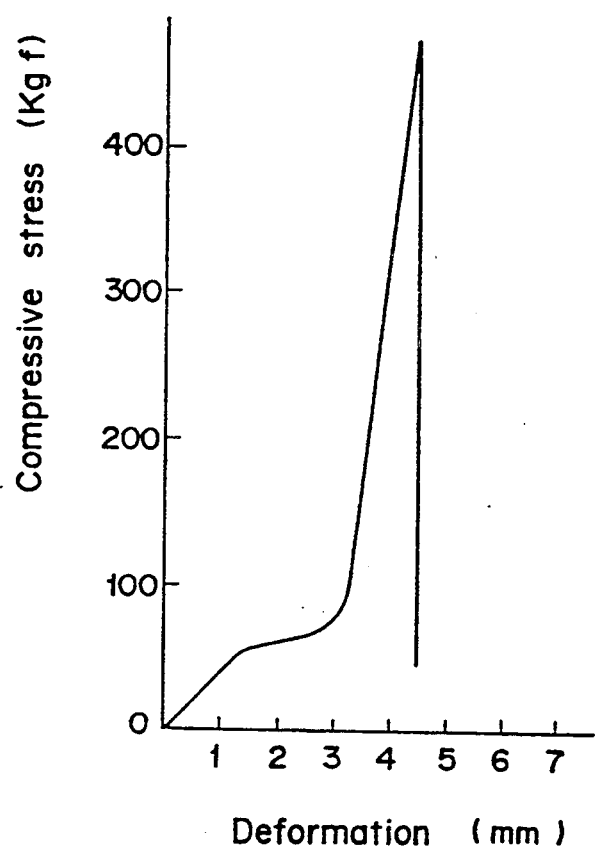
FIG. 22 represents test results conducted on the structure of FIG. 4.

FIG. 22 shows a relation of compression stress and deformation (distortion) when load is applied on the structure having columnar projections 12, as shown in FIG. 4. The structure has a hardness of 35 (JIS-A type hardness meter) and, with making reference to FIG. 6, a thickness D of 0.5 mm, a height of A' of 3 mm, a diameter B' of 15 mm and a distance C' of 4 mm. A test piece has a disk shape having a diameter of 50 mm, of which area is 19.63 cm² which nearly equals to an area contacting the ground of the tip toe and heel. A is shown in FIG. 7, the compression stress slowly increases until a deformation is 3 mm, but it rapidly increases over 3 mm. When the weight load is light, the structure is small in stiffness because of the low hardness of the elastic material and the existence of the projections 12, so as to deform an adequate amount. When the weight load is heavy, the projections 12 are bent down to show a high stiffness and the structure deforms a small amount to support the heavy weight load. Accordingly, when the structure is employed as inner sole of sports shoes, it absorbs impact force to the ground, and the heavy weight load, such as the body weight and the impact force at the time of striking the ground is supported by a small deformation to tightly fix the ankle. The structure therefore functions as a good shock absorbing structure which does not inhibit exercising motions.

Table 5 shows the anisotropy of elastic shear properties of the shock absorbing structure of the present invention.

This test was conducted as follow: The superposed structures of the second embodiment as shown in FIG. 5 were placed on the up side and down side of a disk having a diameter of 50 mm, which was incorporated into a compression tester equipped with a circular pressing plate having a diameter of 50 mm. The structure was pulled out sideways at each load of 5 kg f, 10 kg f and 20 kg f, for which a shear force was determined to show in Table 4.

TABLE 5

| No. | Hardness[1] and dimention | Direction[2] (Upper/lower) | Thickness (mm) (Upper/lower) | Shear force (kgf/mm) | | |
|---|---|---|---|---|---|---|
| | | | | 5 kgf load | 10 kgf load | 20 kgf load |
| 1 | Hardness 25 A' = 3.0 mm, B' = 1.5 mm C' = 4.0 mm, D' = 0.5 mm | X direction Y direction | 3.5/3.5 3.5/3.5 | 4.5 4.4 | 5.5 5.6 | 6.9 7.0 |

[1] JIS-A type hardness meter.
[2] This direction shows the direction of pulling out the disk. X direction and Y direction is a right angle.

As is apparent from Table 4, shear forces are the same in the X direction and Y direction.

The shock absorbing structure of the present invention can be typically employed as the inner sole of shoes. The term "inner sole" includes both that it is incorporated into the inside of a sole and that it is placed on a sole. The former is commonly done. The structure of the present invention can be used in various forms to exhibit various properties, whereby it is applicable as an inner sole to many applications, such as shoes in daily life, sports shoes for jogging, tennis, golf, and shoes for medical usage.

FIG. 23 shows that one shock absorbing structure 20 of the present invention is incorporated as an inner sole into the tip toe of a shoe 40. In FIG. 24, two superposed structures 30 of the present invention are further superposed with each other with the projections facing each other to form one layer and two such layers are incorporated as innersole into a heel portion.

According to present invention, the ridges and the projections spaced apart in parallel are bent down at a light weight load to absorb impact force. At a heavy weight load, they are completely bent down to act as if it was a solid rubber-like elastic material which supports the heavy weight load with a small deformation. This can firmly fix the ankle and prevent the twist of it. The structure may further have the protrusions 3 and 13 on the ridges and the projections and the hollows 4 and 14 joining with the protrusions 3 and 13 in the base 1 and 11. If necessary, two structures may be superposed on each other so that the ridges or the projections face each other and alternately engage with each other. The structure of the present invention is very light and has good durability. The structure indicates excellent shock absorbing properties in all directions and also effectively produces a reaction force. The structure of the present invention is very suitable as a shock absorbing material for shoes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A shock absorbing member comprising a base, having a plurality of ridges spaced apart in parallel over an entire surface of said base, said shock absorbing member being comprised of a material having an elasticity similar to that of rubber with a hardness in the range of 5 to 60 according to a JIS-A hardness meter, wherein a height of said ridges is greater than a thickness of said ridges, and a distance between two centers of adjacent ridges is greater than twice said thickness of said ridges, said ridges having protrusions thereon, and a plurality of hollows over said entire surface of said base intermittently spaced apart between said ridges, said hollows being of substantially the same shape as said protrusions on said ridges, said protrusions and said hollows having a height substantially equal to a thickness of said base.

2. A shock absorbing member comprising a base, having a plurality of ridges spaced apart in parallel over an entire surface of said base, said shock absorbing member being comprised of a material having an elasticity similar to that of rubber with a hardness in the range of 5 to 60 according to a JIS-A type hardness meter, such that a tangent (tan $\delta$) of a phase difference between displacement and stress at a frequency of 10 Hz is not less than 0.2 at a temperature of up to 10° C. and is not more than a half of said tangent at 10° C., wherein a height of said ridges is greater than a thickness of said ridges, and a distance between two centers of adjacent ridges is greater than twice said thickness of said ridges, said ridges having protrusions thereon, and a plurality of hollows in said surface of said base spaced apart intermittently between said ridges, said hollows being of substantially the same shape as said protrusions on said ridges, said protrusions and said hollows having a height equal to a thickness of said base.

3. A composite shock-absorbing structure comprising two shock-absorbing members superimposed one on the other, each of said shock absorbing members comprising a base, having a plurality of ridges spaced apart in parallel over an entire surface of said base, said shock absorbing member being comprised of a material having an elasticity similar to that of rubber with a hardness in the range of 5 to 60 according to a JIS-A type hardness meter, such that a tangent (tan $\delta$) of a phase difference between displacement and stress at a frequency of 10 Hz is not less than 0.2 at a temperature of up to 10° C. and is not more than a half of said tangent at 10° C., wherein a height of said ridges is greater than a thickness of said ridges, and a distance between two centers of adjacent ridges is greater than twice said thickness of said ridges, said ridges having protrusions thereon, and a plurality of hollows in said surface of said base spaced apart intermittently between said ridges, said hollows being of substantially the same shape as said protrusions on said ridges, said protrusions and said hollows having a height equal to a thickness of said base, such that said protrusions of one of said shock absorbing members are inserted into corresponding hollows opposite said protrusions in the base of the other of said shock absorbing members to provide said composite shock absorbing structure.

4. Footwear comprising a composite shock absorbing structure comprising two shock absorbing members superimposed one on the other, each of said shock absorbing members comprising a base, having a plurality of ridges spaced apart in parallel over an entire surface of said base, said shock absorbing member being comprised of a material having an elasticity similar to that of rubber with a hardness in the range of 5 to 60 according to a JIS-A type hardness meter, such that a tangent (tan $\delta$) of a phase difference between displacement and stress at a frequency of 10 Hz is not less than 0.2 at a temperature of up to 10° C. and is not more than a half of said tangent at 10° C., wherein a height of said ridges is greater than a thickness of said ridges, and a distance between two centers of adjacent ridges is greater than twice said thickness of said ridges, said ridges having protrusions thereon, and a plurality of hollows in said surface of said base spaced apart intermittently between said ridges, said hollows being of substantially the same shape as said protrusions on said ridges, said protrusions and said hollows having a height equal to a thickness of said base, such that said protrusions of one of said shock absorbing members are inserted into corresponding hollows opposite said protrusions in the base of the other of said shock absorbing members to provide said composite shock absorbing structure, said composite shock absorbing structure being incorporated into a sole of a shoe.

* * * * *